United States Patent Office 2,856,523
Patented Oct. 14, 1958

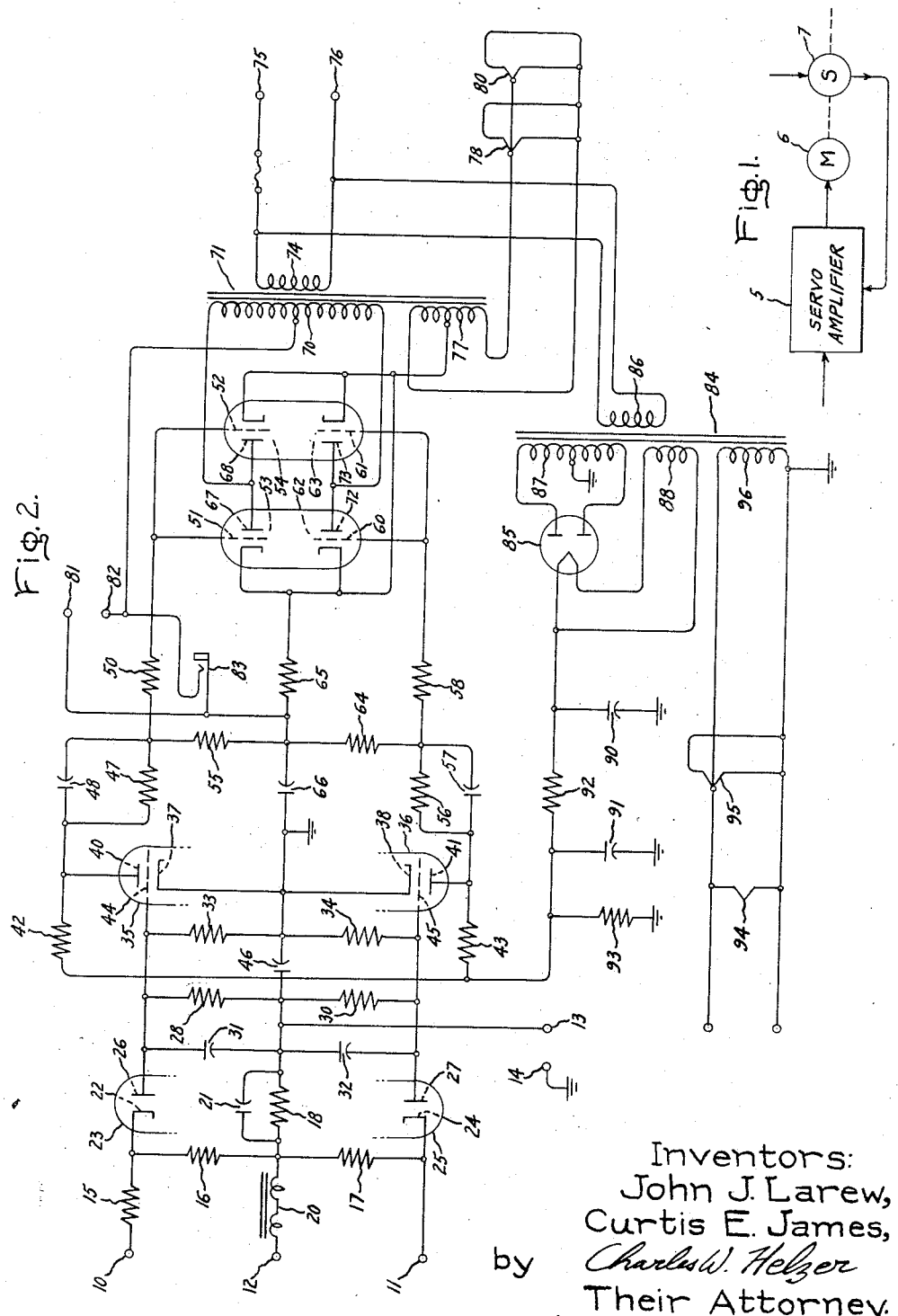

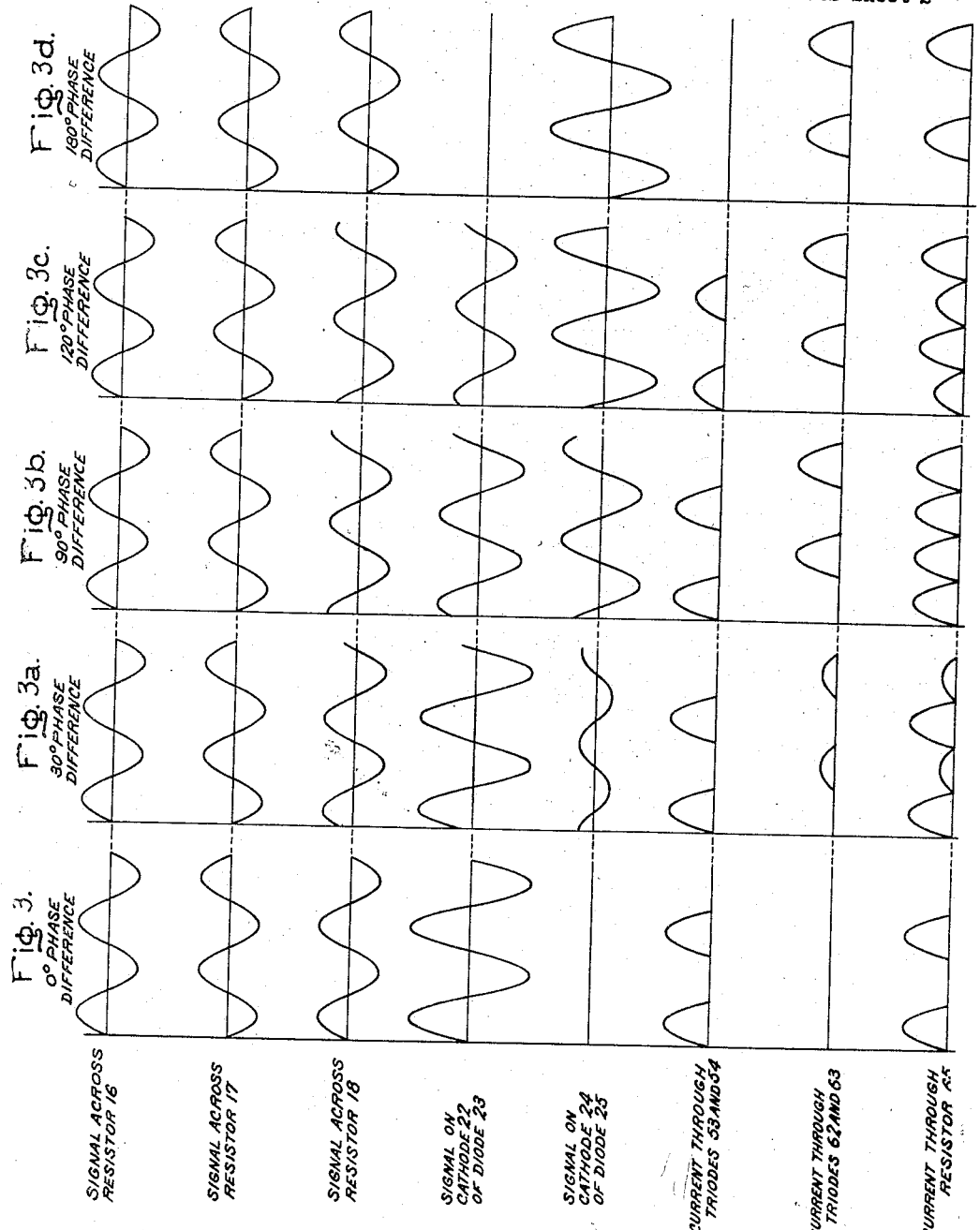

2,856,523
SERVO SYSTEM

John J. Larew, Scotia, and Curtis E. James, Schenectady, N. Y., assignors to General Electric Company, a corporation of New York Application November 30, 1953, Serial No. 395,119

2 Claims. (Cl. 250—27)

This invention pertains to servo systems, and more particularly to a novel servo system, in which the frequencies of two input signals are compared and an output shaft caused to rotate at a speed which is proportional to the frequency difference between the input signals, and in a direction determined by the direction of frequency difference.

Servo systems of the type which produce an output, whose amplitude is proportional to the difference in amplitude between two input signals are well known in the art. However, in present-day control and computing equipment, there is need for a servo system, which is capable of comparing the frequency or phase of an input signal with the frequency or phase of a reference signal and producing an output shaft rotation at a speed which is proportional to the difference and in a direction determined by whether the frequency of the input signal is greater than or less than the reference signal frequency. Therefore, a primary object of this invention is to provide such an amplifier without the use of an excessive number of vacuum tubes or complicated circuitry.

Another object of the invention is to provide a servo system for comparing the frequencies of two signals, which does not require that both signals be pure sine waves.

A further object is to provide a servo system of this type, which has high sensitivity and which is constructed of standard readily available components.

A further object is to provide a novel servo amplifier for comparing the phase or frequency of an input signal with the phase or frequency of a reference signal and producing an output voltage which is related to the phase or frequency difference between the signals.

A servo system constructed in accordance with the invention includes a servo amplifier, which may comprise a phase detector stage, a direct current amplifier stage and a power output stage. The phase detector includes a pair of diode electron discharge devices to which a reference signal and input signal, whose frequencies or phases are to be compared, are applied, and the diodes are so connected that their outputs are two D. C. voltages, whose relative amplitudes are indicative of the frequency or phase relationship between the A. C. input signals. The difference between these D. C. voltages is amplified in the D. C. amplifier stage, whose output signal controls the power output stage. The power output stage comprises a pair of triode electron discharge devices, whose anodes are supplied with A. C. voltages 180 degrees out of phase with each other, and one phase of a two-phase motor, which is to be driven in response to the input signal phase difference, is connected in the common cathode circuit of the triodes. If there is an output signal from the D. C. amplifier stage, one of the output triodes will conduct more heavily than the other and the motor, whose second phase is supplied with voltage which agrees in phase with the A. C. voltage supplied to the anodes of the triodes, will be caused to turn. The direction in which the motor turns depends on which of the output triodes conducts most heavily, which, in turn, depends on the polarity of the D. C. amplifier output signal, and the polarity of this signal is controlled by the frequency or phase relationship between the A. C. input signals.

The motor rotates the rotor of a convention selsyn, whose stator is energized by the signal whose frequency or phase is to be compared with the reference signal, and the signal induced in the selsyn rotor provides the input signal to the servo amplifier previously mentioned. If there is an output from the amplifier, the motor is caused to turn in a direction and at a speed such that the frequency or phase of the signal induced on the selsyn rotor agrees with the frequency or phase of the reference signal. This condition occurs when the motor and the selsyn rotor are rotating at a speed which is proportional to the frequency or phase difference between the input signal and the reference signal.

For a better understanding of the invention, reference is made to the following description taken in conjunction with the accompanying drawings, in which—

Fig. 1 is a schematic block diagram of one form of the invention;

Fig. 2 is a schematic circuit diagram of the servo amplifier which may be used in system of the invention; and Figs. 3, 3a, 3b, 3c and 3d are diagrams showing the various voltage and current relationships throughout the circuit, when the input signals differ in phase by 0°, 30°, 90°, 120° and 180°, respectively.

Referring to Fig. 1, it is seen that the servo system of the invention comprises a servo amplifier 5, a conventional two-phase motor 6 and a conventional control transformer selsyn 7. One input to the servo amplifier 5 may be from a frequency standard or other source (not shown), and the second input is from the rotor of the selsyn 7. The stator winding of the selsyn 7 is energized by the signal whose frequency or phase is to be compared to that of the signal from the frequency standard or other source, which is connected to the first input of the amplifier. If there is a difference in frequency or phase between the input signals to the servo amplifier, which will be later described in detail, there is an output from the amplifier, which causes the motor 6 to rotate; the rotor of the selsyn is connected to the output shaft of the motor and rotates with it.

As is well known, the voltage induced in the rotor winding of a control transformer selsyn has the same frequency as the voltage which energizes the stator winding of the transformer, if the rotor is not rotating. However, if the rotor is turning, the frequency of the voltage induced across the rotor winding will differ from that of the stator voltage by an amount determined by the speed of rotation of the rotor. For example, if the stator is energized by a voltage having a frequency of 60 cycles per second, and the rotor is rotated at five revolutions per second, the voltage induced in the rotor winding will have a frequency of either 55 or 65 cycles per second, depending on the direction of rotation of the rotor. Thus, in the present instance, as the motor 6 turns in response to a phase or frequency difference between the servo amplifier input signals, it will cause the frequency or phase of the second input signal, which is taken from the rotor of the control transformer selsyn 7, to vary. It is apparent that, when these elements are connected as a servo system in the manner shown in Fig. 1, the motor 6 will be caused to rotate at a speed which is proportional to the phase or frequency difference between the first input signal to the servo amplifier and the signal which energizes the stator winding of the selsyn.

Of course, when the frequencies of two signals are different, their phases are also different. For purposes of ease of description and illustration, the following description will use the terms "phase difference" and "phase" to mean both frequency and phase difference and frequency and phase, respectively.

Referring now to the servo amplifier circuit shown diagrammatically in Fig. 2, one of the two input signals, which must be approximately a sine wave and must not be grounded, may be connected to input terminals 10 and 11, and the second input signal connected to terminals 12 and 13 if the signal is not grounded, or to input terminals 12 and 14 if the signal is grounded. The input signal connected to terminals 10 and 11, which is taken to be the reference signal and will be hereafter referred to as signal "A," produces a voltage drop across resistors 15, 16, and 17, connected in series between the input terminals. Resistors 16 and 17 are of the same value, so that the signals appearing across them are equal, and resistor 15 serves merely as a series dropping resistor.

The second input signal is assumed, for purposes of explanation, to be ungrounded and connected to terminals 12 and 13. This signal, which is taken to be the signal induced on the rotor of selsyn 7 and will be hereafter referred to as signal "B," appears across a resistor 18 connected between terminal 13 and the junction of resistors 16 and 17. An inductance 20 is connected between input terminals 12 and the junction of resistors 16 and 17, and operates as a filter in conjunction with a capacitor 21 connected across resistor 18, which permits the application of a square wave to terminals 12 and 13 rather than a sine wave.

The junction of resistors 15 and 16 in the signal input circuit is connected to the cathode 22 of an electron discharge device 23 of the diode type, and input terminal 11 is connected to the cathode 24 of a similar discharge device 25. The diode electron discharge devices 23 and 25, which comprise the phase detector, are shown as being enclosed in a single glass envelope, but it is obvious that they may be individual tubes, if desired. It is now seen that at any instant, the signal appearing on cathode 22 of diode 23 will be the vector sum of the signals appearing across resistors 16 and 18, and the signal appearing at cathode 24 of discharge device 25 will be the vector sum of the signals appearing across resistors 17 and 18.

Anode 26 of discharge device 23 and anode 27 of discharge device 25 are connected together through resistors 28 and 30, the midpoint of which is connected to input terminal 13. Resistors 28 and 30 are of equal value so that, when diodes 23 and 25 are conducting equally, equal signals appear across the two resistors. Capacitors 31 and 32 are connected across resistors 28 and 30, respectively, and act in conjunction with the resistors to filter the output signal of the diodes. If the input signals to the circuit are such that equal signals appear on cathodes 22 and 24 of the diodes, the diodes will conduct equally, and equal negative signals will appear on the anodes 26 and 27. If the input signals are so related that unequal signals appear on the cathodes of the diodes, as will be later explained in detail, one diode will conduct more heavily than the other, and the D. C. voltage appearing at its anode will be more negative than that appearing at the anode of the other diode.

The D. C. voltages appearing across resistors 28 and 30 also appear across resistors 33 and 34, which serve as grid resistors for two D. C. amplifiers comprising triode electron discharge devices 35 and 36, which are shown as enclosed in a single glass envelope, although they may, of course, be individual tubes. The cathodes 37 and 38 of triodes 35 and 36 are grounded and anodes 40 and 41 of the triodes are connected through resistors 42 and 43, respectively, to a source of D. C. voltage, which will be later described. The control grid 44 of triode 35 receives the negative D. C. signal appearing at the anode 26 of diode 23, and control grid 45 of triode 36 receives the negative D. C. signal appearing at the anode 27 of diode 25. A capacitor 46 is connected between the juncture of resistors 33 and 34 and the juncture of resistors 28 and 30 and serves to permit the grid-to-cathode voltages of triodes 35 and 36 to be zero at the balance condition. That is, capacitor 46 causes only the difference in the voltages appearing across resistors 28 and 30 to be applied to the D. C. amplifiers, and maintains an alternating current ground at the juncture of resistors 28 and 30.

The output of the D. C. amplifiers is taken from anodes 40 and 41 of triodes 35 and 36 and is coupled through anti-hunt networks to the input of a power output stage. The signal appearing at anode 40 of triode 35 is connected through an anti-hunt network, comprising a resistor 47 and a capacitor 48 connected in parallel, and through a current limiting resistor 50 to control grids 51 and 52 of a pair of parallel-connected triode electron discharge devices 53 and 54, respectively, which are connected in parallel and have a grid resistor 55 across which the signal appears. Similarly, the signal appearing at anode 41 of triode 36 is connected through an anti-hunt network, comprising resistor 56 and capacitor 57, and through a current limiting resistor 58 to parallel-connected control grids 60 and 61 of triode electron discharge devices 62 and 63, where the signal appears across a grid resistor 64. The cathodes of triodes 53, 54, 62, and 63 are connected through a biasing resistor 65 to the juncture of grid resistors 55 and 64. A capacitor 66 is connected between the juncture of resistors 55 and 64 and ground, and functions in a manner similar to that of capacitor 46 previously described.

The parallel-connected anodes 67 and 68 of triodes 53 and 54 are connected to one end of a secondary winding 70 of a transformer 71, and parallel-connected anodes 72 and 73 of discharge devices 62 and 63 are connected to the other end of the secondary winding 70. Thus, the voltage supplied to anodes 67 and 68 is 180° out of phase with the voltage supplied to anodes 72 and 73, and the triodes cannot all conduct simultaneously. The primary winding 74 of transformer 71 is connected across power input terminals 75 and 76, to which a standard 110 volt 60 cycle alternating current source may be connected. A filament winding 77 on transformer 71 provides filament voltages of the proper magnitude for filament 78 of triodes 53 and 62, and for filament 80 of triodes 54 and 63.

The connection to one phase of the two-phase motor (not shown), which it is desired to have respond to a phase difference between the input signals, is connected across output terminals 81 and 82 in the anode-cathode circuit of the output triodes. Terminal 81 is connected to the cathodes of triodes 53, 54, 62, and 63 through biasing resistor 65, and terminal 82 is connected to a center tap of the secondary winding 70 of transformer 71. A jack 83 may be connected across terminals 81 and 82, so that the output may be monitored, if desired.

The anode voltage for the D. C. amplifier triodes 35 and 36 is provided by a power supply comprising a power transformer 84 and an electron discharge device 85 of the double diode type. The primary winding 86 of transformer 84 is connected to power input terminals 75 and 76, and secondary windings 87 and 88 are connected to electron discharge device 85 in the conventional manner to provide full wave rectification. The D. C. output of double diode 85 is filtered by capacitors 90 and 91 and resistor 92, which are connected in conventional manner, before being applied to the anodes 40 and 41 of triodes 35 and 36. A resistor 93 is connected in parallel with capacitor 91 and serves as a bleeder, which permits the removal of the charge from the capacitor when power is removed from the circuit. The filament 94 of diodes 23 and 25 and the filament 95 of triodes 35 and 36 are supplied by a secondary winding 96 of transformer 84 in the usual manner.

For purposes of explanation, the operation of the amplifier circuit will be considered first with reference to two input voltages which are in phase agreement and of such amplitude that equal signals appear across resistors 16, 17, and 18. In this case, the vector sum of the signals appearing across resistors 16 and 18 will appear on cathode 22 of diode 23, and the vector sum of the signals appearing across resistors 17 and 18 will appear on cathode 24 of diode 25. Therefore, as seen in Fig. 3, the signal appearing at cathode 22 of diode 23 will be a sine wave, whose phase agrees with the phase of the two input signals and whose amplitude is twice that of the signal appearing across resistor 16 or resistor 18. The signal appearing on cathode 24 of diode 25 will be zero, because it is the sum of equal negative and positive signals which cancel each other. During the first half of each cycle, the cathode 22 of diode 23 will be positive with respect to its anode 26, and diode 23 will not conduct; during the second half of the cycle, cathode 22 will be negative with respect to anode 26, and diode 23 will conduct. This causes a voltage drop across resistor 28, and charges capacitor 31. At the same time, because there is no signal appearing at cathode 24 of diode 25, no current flows through resistor 30 and no charge is built up across capacitor 32. Therefore, current will flow through resistors 33 and 34, in the control grid circuits of discharge devices 35 and 36, and control grid 45 of triode 36 will become positive with respect to cathode 38 while control grid 44 of triode 35 will become negative with respect to cathode 37. Thus, triodes 35 and 36 operate in push-pull fashion to cause a signal to appear across resistors 55 and 64 in the input circuit to the power stage. Therefore, control grids 51 and 52 of triodes 53 and 54 will tend to go positive with respect to their cathodes, while control grids 60 and 61 of triodes 62 and 63 will go negative with respect to their cathodes. In this case, the signals appearing across resistors 55 and 64 are of such amplitude as to cause maximum current flow through triodes 53 and 54, while causing triodes 62 and 63 to cut off.

Anodes 67 and 68 of triodes 53 and 54 are connected to one end of secondary winding 70 of transformer 71, and anodes 72 and 73 of triodes 62 and 63 are connected to the other end of secondary winding 70. Therefore, it is apparent that when anodes 67 and 68 are positive, anodes 72 and 73 will be negative, and vice versa. Thus, if control grids 51 and 52 are of the same potential as control grids 60 and 61, the current flow through discharge devices 53 and 54 during one half of each cycle of the A. C. input voltage will be the same as that through discharge devices 62 and 63 during the other half of each cycle. However, in the present example, a positive signal will appear on control grids 51 and 52 while a negative signal appears on control grids 60 and 61. Therefore, the current flow through electron discharge devices 53 and 54 will exceed that through discharge devices 62 and 63. This means that, because one phase of the motor 6 is connected between terminals 81 and 82 in the cathode-to-plate path, there will be a pulse of current through one phase of the motor winding which corresponds in time to that portion of each A. C. input cycle when anodes 67 and 68 are positive. During the remaining half of each cycle, when anodes 72 and 73 are positive and anodes 67 and 68 are negative, there will be no current flow because no positive signal has appeared on control grids 60 and 61 of discharge devices 62 and 63. It is noted that one phase of the motor 6 is connected across terminals 81 and 82, while the other phase of the motor would be energized by 60-cycle alternating current of the same phase as that which energizes primary winding 74 of transformer 71. Therefore, when the input signals are in phase current will flow simultaneously through both windings of the two-phase motor during only one half of each cycle, and the motor will turn in a certain direction.

The gain of the circuit described herein is great, and, therefore, it is noted that the amplitudes of the voltage pulses appearing between terminals 81 and 82 will be indicative of the phase difference between the input signals only when that phase difference is small. When the phase difference between the input signals is great, the motor will run at full speed regardless of changes in the phase difference, until the phase difference between the input signals has been reduced to nearly zero.

The motor 6 is so connected such that, when the phase difference between the amplifier input signals is zero, the motor rotates the rotor of selsyn 7 in a direction to add to the phase of the voltage which energizes the selsyn stator winding and thus increases the phase difference between the amplifier input signals.

Next consider the case where the input signals differ in phase by 30 degrees, as shown in Fig. 3a. In this case, the signal appearing at cathode 22 of diode 23, which is the vector sum of the signals appearing across resistors 16 and 18, will be approximately twice as great and 90 degrees out of phase with the signal appearing at cathode 24 of diode 25, which is the vector sum of the signals appearing across resistors 17 and 18. Thus, control grid 44 of triode 35 will again tend to become negative and control grid 45 of triode 36 positive with respect to their common cathode connection, although not by as great an amount as in the first example. Control grids 51 and 52 of triodes 53 and 54 will again tend to go positive, and there will be maximum current flow through these triodes during the positive portion of their anode voltage cycle. Control grids 60 and 61 of triodes 62 and 63 will tend to go negative but not by an amount sufficient to completely cut off the triodes. Therefore, there will be current flow in the cathode circuit of the output power stage during both halves of each anode voltage cycle, but the current flow during one half of the cycle will be approximately twice as great as that during the other half of the cycle. Thus, the motor 6 will turn in a direction determined by the phase of the greater signal with reference to the 60-cycle current which energizes the other phase of the motor, and will again turn the rotor of selsyn 7 in a direction to increase the phase difference between the amplifier input signals.

In the third case, as illustrated in Fig. 3b, when the input signals are 90 degrees displaced in phase, the signals appearing on cathodes 22 and 24 of discharge devices 23 and 25, respectively, are of equal amplitude, and the control grids 44 and 45 of triodes 35 and 36 are at the same potential as their cathodes. Therefore, no signal will appear on the control grids of output triodes 53, 54, 62 and 63, and these triodes will all have maximum current flow therethrough. In this case, equal currents will flow in the cathode circuit of the output stage during both halves of each anode voltage cycle; the motor 6 will be equally energized during both halves of each cycle, and, consequently, will not turn. Thus, it is apparent that a 90° phase displacement between the input signal to the amplifier is the reference displacement, and if the phase difference is less than 90°, the motor will rotate in a direction to increase the phase difference up to 90°.

It is apparent from the above explanation that when the phase difference between the input signals to the amplifier is greater than 90°, the motor 6 should rotate in the reverse direction to decrease the phase difference. As seen in Figs. 3b, 3c, and 3d, this does occur because the flow of current through the diodes is such as to cause the control grid 44 of triode 35 to tend to go positive and control grid 45 of triode 36 to go negative. Thus, control grids 60 and 61 of triodes 62 and 63 tend to go positive, while control grids 51 and 52 go negative, so that maximum conduction occurs through triodes 62 and 63 and reduced conduction occurs through triodes 53 and 54. Therefore, the greatest current flows through the winding of motor 6 during the second half of each cycle, rather than during the first half, as when the phase difference was less than 90°, and the motor turns the rotor of selsyn 7 in a direction to subtract from the phase of the voltages which energize the selsyn stator and thus reduce the phase difference between the amplifier input signals.

It is now seen that the servo system of the invention operates such that the motor rotates at a speed which is directly proportional to the phase difference between the two input signals. It is noted that in operation, the phase difference between the input signals would generally not become large, because, as soon as a phase difference appears, the motor is energized to vary the phase of one of the input signals in a manner so as to reduce the phase difference.

It is further noted that under conditions in which the amplitude of the input signals appearing across resistors 16, 17 and 18 are not equal, the only effect on the operation of the circuit is to reduce its sensitivity. This effect occurs because the sum and difference signals appearing at the cathodes of discharge devices 23 and 25 are not in quadrature, but are at a smaller angle, and consequently motor torque will be somewhat reduced. However, because the system is of the zero-seeking type, the position accuracy of the system is unaffected by amplitude changes of the input signals.

The following table of values of circuit elements is cited as exemplary only, and it is understood that the invention is not limited to the use of any particular values for the various elements:

| | |
|---|---|
| Resistor 15 | 47 kilohms. |
| Resistor 16 | 10 kilohms. |
| Resistor 17 | 10 kilohms. |
| Resistor 18 | 100 kilohms. |
| Capacitor 21 | .02 mf. |
| Diodes 23 and 25 | Type 5726. |
| Resistor 28 | 470 kilohms. |
| Resistor 30 | 470 kilohm. |
| Capacitor 31 | 0.5 mf. |
| Capacitor 32 | 0.5 mf. |
| Resistor 33 | 1 megohm. |
| Resistor 34 | 1 megohm. |
| Triodes 35 and 36 | Type 6201. |
| Resistor 42 | 0.1 megohm. |
| Resistor 43 | 0.1 megohm. |
| Capacitor 46 | 0.1 mf. |
| Resistor 47 | 3.3 megohms. |
| Capacitor 48 | .02 megohms. |
| Resistor 50 | 1 megohm. |
| Triodes 53 and 62 | Type 5814. |
| Triodes 54 and 63 | Type 5814. |
| Resistor 55 | 1 megohm. |
| Resistor 56 | 3.3 megohms. |
| Capacitor 57 | .02 megohms. |
| Resistor 58 | 1 megohm. |
| Resistor 64 | 1 megohm. |
| Resistor 65 | 150 ohms. |
| Capacitor 66 | 0.1 mf. |
| Diode 85 | Type 6087. |
| Capacitor 90 | 4 mf. |
| Capacitor 91 | 4 mf. |
| Resistor 92 | 10 kilohms. |
| Resistor 93 | 100 kilohms. |

It is now apparent that we have provided a servo system which has fulfilled the objects of the invention and which has great use in the art. It is apparent that many changes and modifications may be made by one skilled in the art without departing from the spirit of the invention or its scope, as defined by the appended claims.

What we claim as new and desire to secure by Letters Patent of the United States is:

1. Apparatus for comparing the phases of two alternating current input signals comprising a pair of diodes each having an anode and a cathode, a pair of resistors connected in series with one another across the anodes of said diodes, means for applying the sum of voltages derived from said alternating current input signals across the common terminals of said resistors and the cathode of one of said diodes, means for applying the difference of voltages derived from said alternating current input signals across the common terminals of said resistors and the cathode of the other of said diodes, a capacitor directly connected across each of said resistors, a pair of electron discharge devices, each having an anode, a cathode, and a control grid and having their cathodes connected together, means for directly connecting the control grids of said electron discharge devices to the anodes of said diodes, a pair of grid resistors connected in series with one another across the control grids of said electron discharge devices and having common terminals connected to the cathodes thereof, a capacitor connected between the common terminals of said pair of grid resistors and the common terminals of said resistors, means including a pair of anode resistors each connected in a different circuit with the anode of a different one of said electron discharge devices for applying a direct current voltage across the anode-cathode circuits of said electron discharge devices, a second pair of electron discharge devices, each having an anode, a cathode, and a control grid and having their cathodes connected together, means for energizing the anodes of said second pair of electron discharge devices with alternating voltages of opposite phase for producing in the common cathode circuit of said discharge devices two pulsating output signals with 180° displacement therebetween in accordance with the voltages applied to the control grids of said devices, a second pair of grid resistors having common teminals connected through a cathode biasing resistor to the cathodes of said second pair of electron discharge devices and having their other terminals respectively connected through a current limiting resistor to the control grids of said devices, and means for connecting the common terminals of said second pair of grid resistors through a capacitor to the cathodes of said first pair of electron discharge devices and for connecting their other terminals respectively through different ones of a pair of anti-hunt networks to the anodes of said first pair of electron discharge devices, each of said anti-hunt networks consisting of a resistor connected in parallel with a capacitor.

2. Apparatus for comparing the phases of two alternating current input signals comprising a pair of diodes each having two elements, said elements consisting of an anode and a cathode, a first pair of resistors of equal mangitude connected in series across like elements of said diodes, a second pair of resistors of equal magnitude connected across the other like elements of said diodes, an impedance connected between the junctions of said pairs of resistors, means for applying a first input across the first of said pairs of resistors, means for applying a second input across said impedance, a first capacitor connected between the junction of said second pair of resistors and a common connection, whereby direct current signals are developed across each of said resistors of said second pair and said common connection the difference of which is indicative of the phase difference of the input signals, a pair of direct current amplifiers for amplifying said difference signals, a pair of output amplifiers each including at least an anode, a cathode and a control grid, said amplified difference voltages being fed through current limiting resistors to the grids thereof, the cathodes of said output amplifiers being connected together with an impedance including a second capacitor connected between the cathodes and said common connection, a pair of grid resistors connected between said grids and that side of said second capacitor remote from said common connection, and the anodes of said output amplifiers having applied thereto pulsating signals 180° displaced from each other, whereby the amplitude of the signal developed across said cathode impedance is indicative of the phase differences of said two input signals.

References Cited in the file of this patent

UNITED STATES PATENTS

| | | |
|---|---|---|
| 2,433,195 | Bond | Dec. 23, 1947 |
| 2,519,890 | Crosby | Aug. 22, 1950 |
| 2,535,147 | Markusen | Dec. 26, 1950 |
| 2,561,319 | Runyan | July 17, 1951 |
| 2,585,377 | Eisler et al. | Feb. 12, 1952 |
| 2,602,660 | Shannon | July 8, 1952 |
| 2,611,031 | Appert | Sept. 16, 1952 |
| 2,682,627 | Runyan | June 29, 1954 |
| 2,716,208 | Coffin | Aug. 23, 1955 |
| 2,729,772 | Perkins | Jan. 3, 1956 |
| 2,736,859 | Pritchard et al. | Feb. 28, 1956 |
| 2,758,278 | Adams | Aug. 7, 1956 |
| 2,782,994 | Dotson | Feb. 26, 1957 |
| 2,790,943 | Woodward | Apr. 30, 1957 |